United States Patent
Dhandhania

(10) Patent No.: US 11,366,660 B1
(45) Date of Patent: Jun. 21, 2022

(54) INTERFACE LATENCY ESTIMATION BASED ON PLATFORM SUBCOMPONENT PARAMETERS

(71) Applicant: Amazon Technologies, Inc., Seattle, WA (US)

(72) Inventor: Anand Dhandhania, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/447,882

(22) Filed: Jun. 20, 2019

(51) Int. Cl.
*G06F 8/77* (2018.01)
*G06F 9/54* (2006.01)
*G06F 8/73* (2018.01)

(52) U.S. Cl.
CPC .............. *G06F 8/77* (2013.01); *G06F 8/73* (2013.01); *G06F 9/547* (2013.01)

(58) Field of Classification Search
CPC .............. G06F 8/77; G06F 8/73; G06F 9/547
See application file for complete search history.

(56) References Cited

U.S. PATENT DOCUMENTS

| | | | | |
|---|---|---|---|---|
| 8,965,942 | B1* | 2/2015 | Rossum | H03K 5/26 708/313 |
| 9,235,609 | B1* | 1/2016 | Pandey | G06F 16/25 |
| 10,437,634 | B1* | 10/2019 | Chiang | G06F 9/4881 |
| 2011/0179016 | A1* | 7/2011 | Narula | G06F 16/245 707/721 |
| 2016/0225043 | A1* | 8/2016 | Tran | G06F 11/3433 |
| 2017/0026312 | A1* | 1/2017 | Hrischuk | H04L 67/1097 |
| 2017/0244777 | A1* | 8/2017 | Ouyang | H04L 43/08 |
| 2017/0285981 | A1* | 10/2017 | DeArment | G06F 9/4843 |
| 2017/0320211 | A1* | 11/2017 | Akan | G06F 8/34 |

OTHER PUBLICATIONS

Shilpa Talwar et al., "6G: Connectivity in the Era of Distributed Intelligence", [Online], pp. 45-50, [Retrieved from Interent on Jan. 29, 2022], <https://ieeexplore.ieee.org/stamp/stamp.jsp?arnumber=9665431> (Year: 2021).*

S. Browne et al., "A Portable Programming Interface for Performance Evaluation on Modern Processors", [Online], pp. 189-204, [Retrieved from Interent on Jan. 29, 2022], <https://journals.sagepub.com/doi/pdf/10.1177/109434200001400303>, (Year: 2000).*

* cited by examiner

*Primary Examiner* — Ziaul A Chowdhury
(74) *Attorney, Agent, or Firm* — Davis Wright Tremaine LLP

(57) ABSTRACT

An API latency estimation system estimates latencies as a function of subcomponent parameters. The system may obtain first information indicative of at least a characteristic of data of a request provided to an API and second information indicative of at least a utilization of a first subcomponent of the API used to fulfill a subtask of a task of the request. An estimated latency for the first subcomponent to fulfill the subtask is determined at least in part by applying a latency estimation model for the API to at least the first information and the second information. If a comparison of the estimated latency to a measured latency for the first subcomponent to perform the subtask indicates a potential anomaly, then an indication of the potential anomaly may be outputted. The model may be updated with API request fulfillment data that is not anomalous.

20 Claims, 9 Drawing Sheets

US 11,366,660 B1

INTERFACE LATENCY ESTIMATION BASED ON PLATFORM SUBCOMPONENT PARAMETERS

BACKGROUND

Application Programming Interface (API) back-ends are becoming increasingly complex, often involving workflows that take various paths though subcomponents of the API. Latency measurements for an API to service a request can be useful in assessing API performance. However, execution latencies are difficult to predict in API back-ends because such latencies depends on a path a request takes through the various subcomponents, which is unknown.

BRIEF DESCRIPTION OF THE DRAWINGS

Various techniques will be described with reference to the drawings, in which.

DETAILED DESCRIPTION

Figure 1:
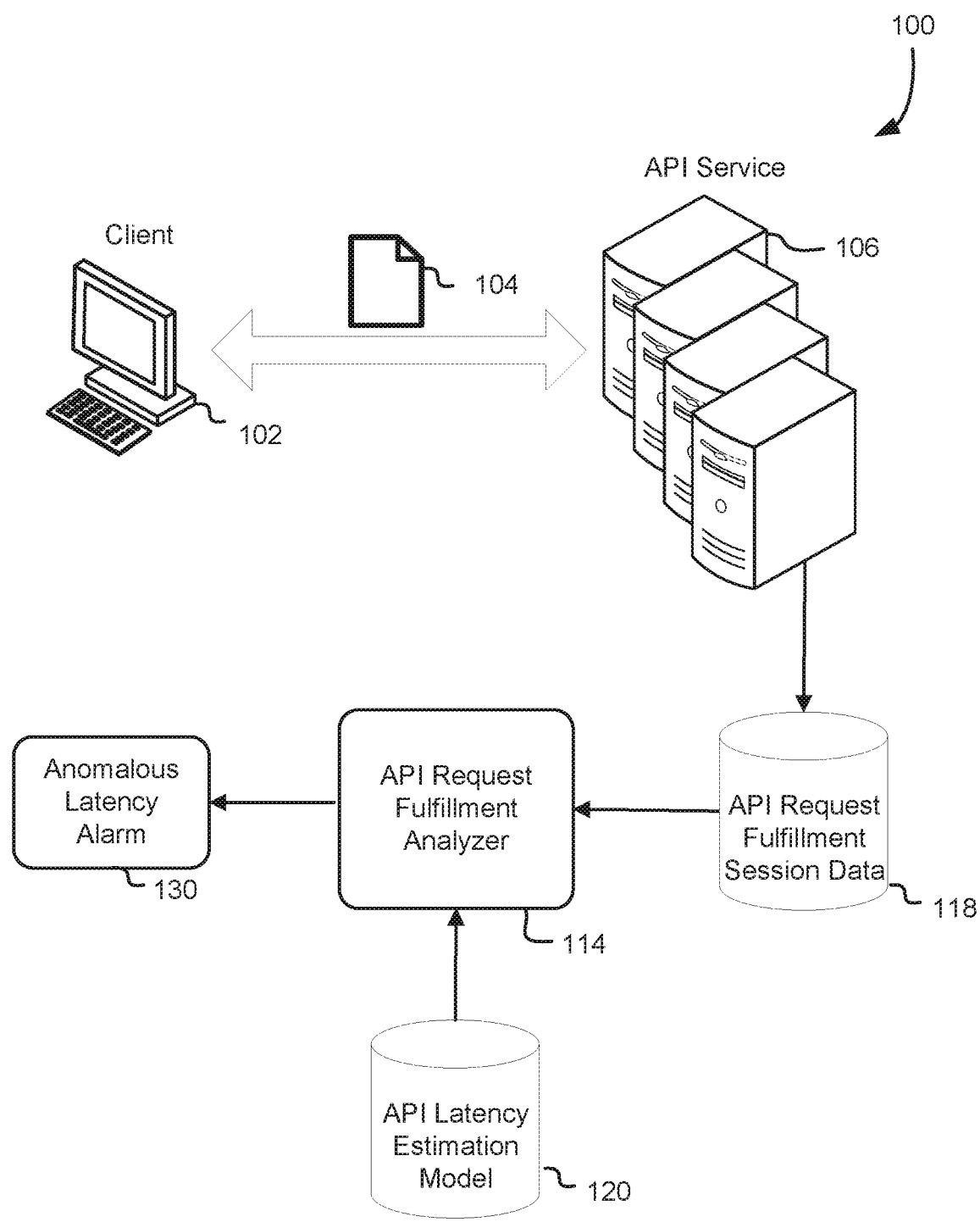
FIG. 1 shows an illustrative example of an environment in which an API service request is monitored and analyzed.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

A system is described herein that learns a latency of a system and subcomponents as a function of parameters such as fleet capacity for the subcomponents, an amount of requests handled by the system or subcomponents at a given point of time, type of hardware used in subcomponents and characteristics of data referenced in an API service request detected by the platform. An API service monitors and stores such data related to a fulfillment of an API request. The data may be input into a latency estimation model to derive an estimated latency for fulfillment of the API request. The estimated latency is compared with an actual latency for fulfillment of the request. If the actual latency exceeds a range or confidence interval with respect to the estimated latency, then an anomalous latency event may be indicated. If the actual latency does not exceed the defined range or confidence interval with respect to the estimated latency, the data may be used to update the latency estimation model.

Anomalous latency events can cause an alarm to be output to an operator. The alarm may include an estimated latency and the measured latency and another other information pertaining to the fulfillment of API request. Operators can select whether the anomalous latency event is a legitimate failure or in case of false alarm provide feedback to the monitoring system. If the operator indicates that the indicated anomalous latency event was a false positive, then the data related to fulfillment of an API request may be used to update the latency estimation model. This allows the latency estimation model to be tuned dynamically, which improves the accuracy of the latency estimation model.

As one skilled in the art will appreciate in light of this disclosure, certain embodiments may be capable of achieving certain advantages, including some or all of the following: decreases time needed to identify a malfunctioning component of a complex orchestration system of an API service, improves API service request performance by improving accuracy in the detection of malfunctioning components, improves identification of components that limit the overall output of a complex API service, and provides for latency estimates with improved reliabilities to be determined for complex multiple component inferencing systems where the latency depends on the path taken by the request. Relatedly, as API service back-ends become a complex orchestration involving different paths through various subcomponents, the present disclosure describes embodiments that may provide reliable API latency estimation as a function of the individual subcomponent parameters like fleet size and characteristics detected by subcomponents while fulfilling the request.

FIG. 1 shows a diagram 100 illustrating a context in which various techniques of the present disclosure may be utilized. In this example, the diagram 100 shows an environment where API request fulfillment session data 118 for an API service request 104 from client 102 to API service 106 is analyzed by API request fulfillment analyzer 114 to identify potential anomalies with an API service 106. The API service 106 may be a complex inferencing system that utilizes different subcomponents that may not reside on the same system to perform different functions, and a path a request will take through the subcomponents may be known or unknown at a time an execution of the request 104 is initiated. The API service 106, in an embodiment, may comprise a server computer system (such as described below) or a distributed computer system comprising multiple server computer systems, each with one or more processors and memory that stores instructions executable by the one or more processors to perform at least some of the operations described herein as being performed by the API service 106. Subcomponents of the API service may implemented as servers or as instances of virtual machines.

The API service request 104 may indicate or specify a task to be completed by the API. The API service request 104 may specify that a task be performed on data by the API. Data may include a plurality of characters, words, numbers, and the like. Data referenced in API service request 104 may comprise a document. A document may be data that provides information. Examples of documents include electronic representations of text, books, articles, images, video, movies, drawings, software applications, computer code, and the like. In one or more implementations, API service request 104 may specify that data be analyzed to identify one or more characteristics pertaining to the data. In some implementations, the API service request 104 may include the data to be analyzed such that the data to be analyzed is sent from a user device along with the API service request 104. In some implementations, API service request 104 may indicate data. For example, API service request 104 may provide a reference (e.g., a link) to data. The API service 106 may obtain the data from a source other than API service request 104. Data indicated by API service request 104 may have characteristics that may be specified in API service request 104, obtained from other sources, or determined at least in part by API service 106. Such characteristics may include an amount of words, lines, pages, words in a particular language, headers, footers, paragraphs, items, human faces, animals, buildings, streetlights, windows, or a size or resolution of the data or document, etc.

API fulfillment analyzer 114 may use a portion of API request fulfillment session data 118 as inputs in API latency estimation model 120 to determine latency estimates for fulfilling a task or subtasks of the API service request 104. The latency estimates may be for an amount of latency that is at least 99.9% likely to not be anomalous. In one or more implementations, API latency model 120 may utilize logistic regression to determine latency estimates. The API fulfillment analyzer 114 may compare estimated latency with measured execution latencies. Measured execution latencies indicate an actual amount of time for API service 106 to fulfill a task or subtask. Such latencies may be measured or obtained by an API request fulfillment monitor or other component of API service 106. Measured latencies may be stored in the API request fulfillment session data 118 along with corresponding characteristics of the API service request 104 or characteristics of API service 106 or a subcomponent of API service 106. The API fulfillment analyzer 114, in an embodiment, may comprise a server computer system (such as described below) or a distributed computer system comprising multiple server computer systems, each with one or more processors and memory that stores instructions executable by the one or more processors to perform at least some of the operations described herein as being performed an API fulfillment analyzer 114.

In one or more implementations, if a measured latency is outside of a range (e.g., +/−20%) or above a threshold (10 or 20%) with respect to a respective estimated latency, then at least a portion of the API request fulfillment session data 118 corresponding to the API service request 104 may be indicated as an anomalous latency event. In one or more implementations, a threshold or range used to classify a measured latency as anomalous or not may correspond to or be based on a confidence interval that an measured latency is not anomalous. The confidence interval may be expressed as a percentage. In one or more implementations, the confidence interval may be provided by API latency model. For example, latency estimation model 104 may be applied to a characteristic of data included in service request to an API service and a characteristic of at least a subcomponent of the API service to determine an estimated latency of 25 milliseconds, and API latency estimation model 140 may provide a 95% confidence interval of 2.5 milliseconds for the estimated latency. In this example, the confidence interval of 2.5 milliseconds may be a threshold used to determine whether a latency measurement is anomalous. In such an example, a measured latency of 29 milliseconds would be indicated as anomalous because 29>27.5, and a measured latency of 26 milliseconds would not be indicated to be anomalous because 26<27.5. In one or more implementations, confidence score may be determined for a measured latency. A confidence score may indicate a confidence level that a measured latency is not anomalous. For example, if a first measured latency for fulfillment of a task corresponds to a 91% confidence interval of a latency estimate for fulfillment of the task, the confidence score for fulfillment of the task is 91. The confidence score may be provided to an operator to indicate a likelihood that a fulfillment of a task is anomalous. For example, a confidence score of 25 may signal to an operator to conduct further investigation.

If an anomalous latency event is determined for a measured latency of a subcomponent or subtask, then the anomalous latency event or a confidence score may be associated with the subcomponent or subtask in the API request fulfillment session data 118. In one or more implementations, an anomalous latency event is triggered for measured latencies with confidence score below a first target latency amount (e.g., 85) and an anomalous latency alarm 130 may be output for measured latency with a confidence score below a second target latency amount 80. The target latency amounts may correspond to confidence intervals that a latency is not anomalous. Anomalous latency alarm 130 may include a notification with information pertaining to a subtask or subcomponent of the API service with the anomalous latency. In some implementations, anomalous latency alarm 130 may include information indicating the anomalous latency or the expected (estimated) latency. A confidence score may be included in the anomalous latency alarm 130. A characteristic (e.g., display color, audio volume) of anomalous latency alarm 130 that is output may depend on a confidence score. For example, for confidence scores below 50, an audio and visual alert may be included in anomalous latency alarm.

Other ways of calculating a confidence score are also considered as being within the scope of the present disclosure. For example, in some implementations, API parameters may be classified into categories (e.g., based on the type of data to be processed and the size) and a probability distribution (e.g., Gaussian) may be determined based on measured latencies. When latency for an API call is measured, a confidence score may be generated based on the distribution. In some examples, a confidence score is generated as (or otherwise based on) the area of the distribution curve from zero until the latency value measured, where scores closer to one indicate higher confidence of an anomaly and certain ranges (e.g., scores less than 0.85) may be categorized as non-anomalous. Another type of confidence score may also be used with such probability distributions. For instance, confidence scores may be generated as or otherwise based on a standard deviation determined from the distribution where high standard deviations are more indicative of low confidence. Other measures of how latencies tend to be distributed relative to a mean latency may also be used as confidence scores.

Note that a notification may be transmitted to a notification service that is configured (e.g., programmed) to process notifications and perform operations accordingly. As another example, anomalous latency alarm 130 may be provided to a log management system where they may be confirmed or marked for further investigation. As yet another example, anomalous latency alarm 130 may be transmitted to an API management system or to an electronic addresses (e.g., email addresses) associated with administrators of the API service 106. Operators may review alarms and indicate individual alarms as legitimate failures, and the API request fulfillment session data with legitimate failures may be excluded from being used to train the API latency estimation model. If an alarm is a false alarm, an operator can indicate the false alarm, and the corresponding API request fulfillment session data may be provided to update the API latency estimation model for making future latency estimates.

The client 102 may be one or more computer systems that may be operable to connect with computer systems such as API service 106, for example, over the internet. Client 102 may include a plurality of different clients. Client 102 may be a hardware device (e.g., a physical, standalone computer system such as a desktop computer, laptop computer, tablet device, mobile device, embedded device, etc.), a software-based system (e.g., a virtual machine instance), or some combination thereof, including, but not limited, to further examples listed below. In some examples, client 102 is a second API service. In one or more implementations, API service 106 is cloud service provider, and client 102 includes multiple customers.

API service 106 may be on or more computer systems that may be operable to connect with computer systems such as the client 102, for example, over the internet. The API service 106 may include a plurality of individual subcomponents that may fulfill individual subtasks of a task included in an API service request. Subcomponents may be hosted locally at part of the API service or may be hosted remotely with respect to other subcomponents and accessible via a network. In one or more implementations, the API service 106 may include a plurality of servers running two or more virtual machine instances, wherein a first virtual machine instance communicates with a second virtual machine instance. API service 106 may provide data analysis services. For example, API service 106 may include a data analysis system comprising a plurality of subcomponents configured to perform a plurality of subtasks to service a request. In one or more implementations, an API service 106 may take data in image or .pdf format and identify characteristics, such as paragraphs, words, lines, tables, key-value pairs, headers, footers, check boxes, and the like using subcomponents of the API service 106. The individual detection algorithms for the API service 106 may be hosted on subcomponents of the API service 106, and a workflow for servicing a request may involve a path through subcomponents of the API service 106. The path may depend on a characteristic (e.g. an amount of paragraphs, lines, tables, etc.) of data (e.g. document) provided in API service request 104 or determined in a prior subtask. Fulfillment of a task may involve a workflow with a plurality of subtasks comprising a first subtask and a second subtask, the second subtask being dependent on the first subtask. For example, the subtask of a workflow may depend on a characteristic of data determined in a first task. A path management component (not shown) may be implemented in hardware or software and included with or coupled to API service 106 and may be used control a path that an API request takes through API service 106.

A workflow through a path and related data determined by subtasks may be stored in API request fulfillment session data 118 and may be organized by session. A session may correspond to a workflow used to fulfill a task of an API service request. API request fulfillment session data 118 may indicate one or more characteristics of data provided in API service request 104. Such characteristics may include resolution, size, and/or amounts of lines, faces, headers, footers, check boxes, tables, key value pairs, images, and the like. Such characteristics may be determined by subtasks of a workflow that fulfills the API service request 104. API request fulfillment session data 118 may include measured latencies for fulfillment of an API service request 104 or subtasks of a session. API request fulfillment session data 118 may include characteristics pertaining to the API service or subcomponents of the API service 106 used to fulfill the API service request 104. Characteristics of subcomponents used to fulfill the API service request 104 may include a utilized capacity of a subcomponent of the API service 106, a demand on the subcomponent, a computing capacity of the subcomponent (e.g., fleet capacity), hardware utilized by a subcomponent (e.g. type of processor), maintenance status, an amount of time since the subcomponent has been restarted, a type of software utilized by the subcomponent, other another characteristic of a subcomponent that is indicative of performance. A hardware characteristic of a subcomponent may indicate or specify, for example, a general type of processor (x86, GPU) used by the subcomponent, or a specific model or build type of a server. Demand, for example, may be indicated by a request rate that is indicative of an amount (e.g., number) of requests handled by a subcomponent for a period of time. Characteristics of subcomponents or the API service 106 may be determined, for example, from other characteristics of the API service 106 or subcomponents of the API service 106. For example, a utilized capacity of a subcomponent may be obtained from a demand of a subcomponent and a capacity of the subcomponent. In another example, an overall demand on the API service 106 may be obtained by adding respective demands of individual subcomponents of the API service 106. A characteristic of a subcomponent stored in API request fulfillment session data for a session may be for a time that the subcomponent was used to fulfill a respective subtask of the session. As discussed below in FIGS. 2 and 3, characteristics of subcomponents or data specified or indicated in API service request 104 may be obtained or stored by an API request fulfillment monitor.

Figure 2:
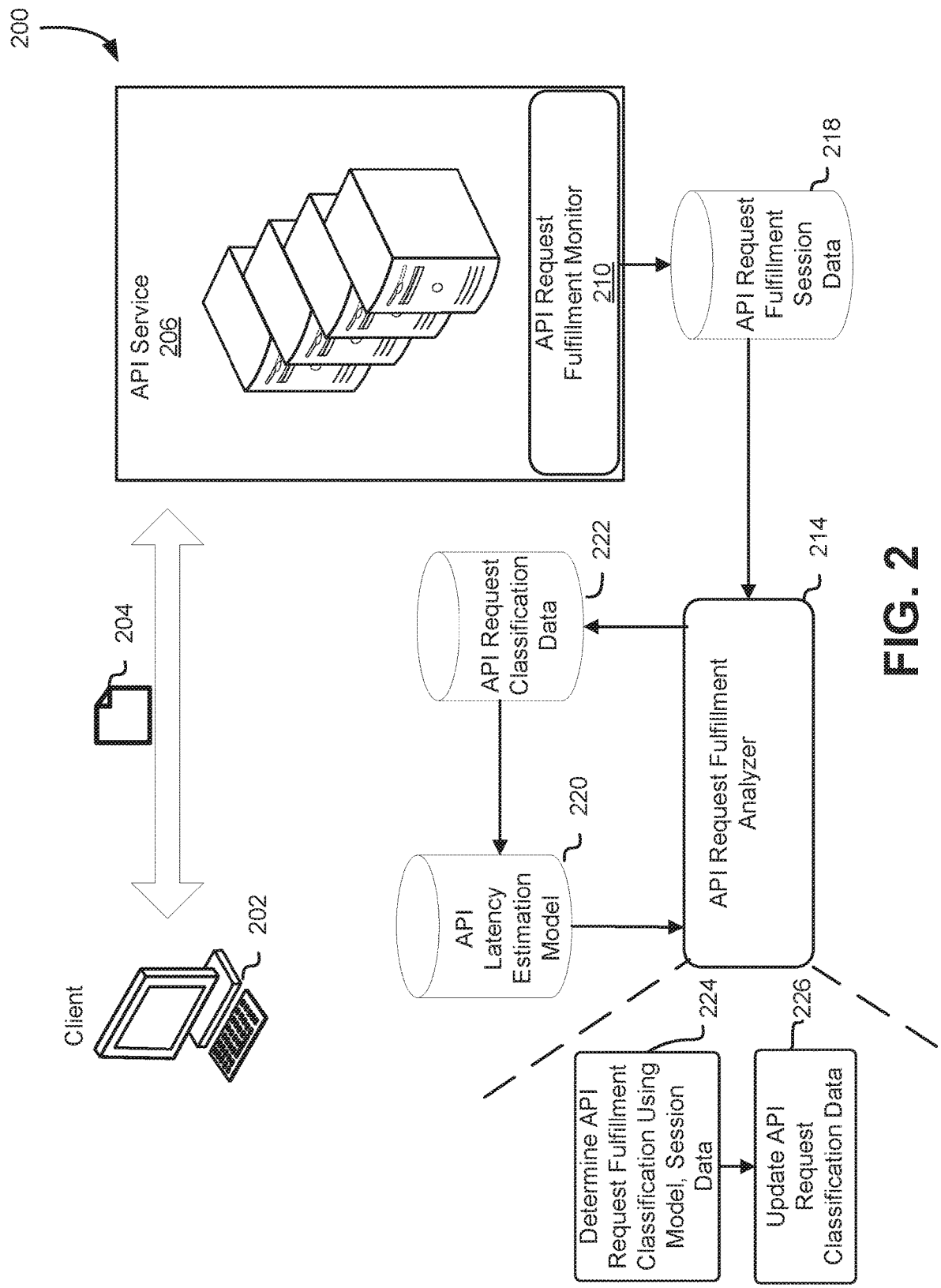
FIG. 2 shows an illustrative environment in which network an API service request is monitored and analyzed.

FIG. 2 shows a diagram 200 illustrating a context in which various techniques of the present disclosure may be utilized. In this particular example, diagram 200 shows an environment where a client 202 provides an API service request 204 to an API service 206 for fulfillment of a task. API service 206 includes or is in communication with an API request fulfillment monitor 210 that is operable to monitor or record data related to fulfillment of a task of API service request 204. Such data may include characteristics or latencies of API service 206 or subcomponents of API service 206, or characteristics of data indicated or specified by API service request 204. API request fulfillment monitor 210 may be configured to monitor and record workflow related to fulfillment of a task requested by API service request 204. Such information may be recorded in API request fulfillment session data 218. API request fulfillment monitor 210 may include hardware or software components coupled to subcomponents of API service 206. The API request fulfillment monitor 210, in an embodiment, may comprise a server computer system (such as described below) or a distributed computer system comprising multiple server computer systems, each with one or more processors and memory that stores instructions executable by the one or more processors to perform at least some of the operations described herein as being performed by the API request fulfillment monitor 210. For example, API request fulfillment monitor 210 may determine and record characteristics of an API service request 204 or characteristics of subcomponents of the API service 106. In one or more implementations, such characteristics of the API service request 204 may be provided with data (e.g., a document) indicated or specified by an API service request 204 (e.g. as metadata) or determined by API service 206 as part of a workflow that fulfills a task requested by an API service request 204. For example, API fulfillment monitor 210 may obtain and record types characteristics of content (e.g., amount of paragraphs, words, lines, or tables) determined by API service 206 in at least part of a workflow that fulfills a task requested by an API service request 204.

In one or more implementations, API request fulfillment monitor 210 may obtain or record latencies associated with a workflow that fulfills a task requested by an API service request 204. For example, API request fulfillment monitor 210 may obtain execution latencies by measuring an amount of time a task or subtask takes to execute (e.g. an amount of time between a subcomponent receiving an input and providing an output). For example, a measured (or "actual") latency of API service 206 may indicate an amount of time from when API service 206 receives an API service request to when a response to an API service request is output (e.g. output from API service 206 provided to client 202).

API request fulfillment monitor 210 may obtain and record characteristics pertaining to API service 206 such as a fleet capacity, request rate, or utilization, hardware type or configuration of subcomponents of the API service 206. Fleet capacity may be indicative of an overall processing capacity, e.g., an amount of instances or servers associated with one or more subcomponents of API service 206. Request rate may be indicative of amount of requests made to API service 206 or a subcomponent of API service 206 per unit time. Utilization may be indicative of a percentage of the fleet capacity that is available and may be determined based on fleet capacity and request rate.

Data obtained by API request fulfillment monitor may be recorded by API request fulfillment monitor 210 in API request fulfillment session data 218, which may be, for example, a repository or a queue. Data stored in API request fulfillment session data 218 may be organized by session (e.g., API requests) in queues or other data structures such as a linked list, array, deque (double-ended queue), list, map, queue, set, stack, unordered map, unordered set, vector, other suitable container, relational databases, distributed queue systems, probabilistic data structures (e.g., Bloom filters, quotient filters, skip lists, random binary trees), and other types of structured data storage. A session may refer to fulfillment of a task requested by an API service request 204. A temporal ordering of subtasks in a workflow of a fulfilled task requested by an API service request 204 may be indicated in API request fulfillment session data 218.

In one or more implementations, the API request fulfillment monitor 210 may locally (e.g., on a local storage device with which communication does not traverse a network) cache a set of API request fulfillment session data 218 for an API service request 204. In an implementation, API request fulfillment monitor 210 detects a service request to API service 206, measures or obtains latencies for fulfilling a task or subtasks of a workflow of the request, detects or obtains fleet capacity or request rate and stores, to the local cache, such data. Upon detecting fulfillment of API service request 204, the locally cached data for the fulfilled API service request 204 may be recorded to the API request fulfillment session data 218, either in whole or in part. The local cache may be implemented using transient storage (e.g., RAM) or non-transient storage (e.g., hard disk drive).

An API request fulfillment analyzer 214 is operable to obtain API request fulfillment session data 218 and API latency estimation model 220 and perform a set of steps 224, 226 that may be used to identify data to update API request classification data 222, which may be used to generate or update API latency estimation model 220. In one or implementations, API request fulfillment session data 218 that is not indicated to be anomalous may be added to API request classification data 222, which is used to train the API latency estimation model. In some embodiments, as with API request fulfillment analyzer 214 discussed above and as noted below in more detail, the API request fulfillment analyzer 214 is a computer system configured (e.g., with executable instructions) to perform operations described herein. In other embodiments, API request fulfillment analyzer 214 is a module (e.g., software or hardware module) component of another component of a distributed computing environment, such as illustrated in FIG. 2. For example, API request fulfillment analyzer 214 may be a component of API service 206 or another component not pictured.

In some embodiments, API request fulfillment analyzer 214 may be a dedicated server within a network that may be used to analyze API request fulfillment session data 218 of one or more session queues. In other embodiments, such as in a distributed computing environment, the analyzing of API request fulfillment session data 218 may be a task or job that is distributed to one or more computing instances (e.g., virtual machine instances) that may be used to complete the task. In one or more implementations, the task or job of analyzing API request fulfillment session data 218 may be distributed among one or more compute instances wherein the one or more compute instances may, in parallel, analyze the network traffic. In one or more implementations, the API request fulfillment analyzer 214 obtains API request fulfillment session data (e.g., one or more characteristics of data provided in API service request, fleet capacity, or request rate) for a fulfilled API service request, analyzes such data using API latency estimation model 220 to determine an estimated latency for fulfillment of a subtask of the workflow, and compares the estimated latency with a measured latency for fulfillment of the API service request.

In an embodiment, if the actual latency for fulfillment of the API service request, exceeds a threshold or is outside of a range, fulfillment of API service request may be classified as anomalous. The threshold may be, for example, 10% or 20% so that if a measured latency exceeds the estimated latency by least the threshold, then fulfilment of the corresponding API service request may be categorized as an anomalous latency event. In some implementations, a confidence score may be determined, based at least in part on the estimated latency, for a measured latency. The confidence score may correspond to a defined confidence interval that the measured latency is not anomalous. For example, a confidence score of 40 may indicate a 40% probability that the measured latency does not correspond to an anomalous event. In such implementations, a confidence score of 40 indicates a higher probability that a measured latency is anomalous than a confidence score of 75. A target latency may be determined for an estimated latency, where the target latency corresponds to a desired confidence interval that a latency is not anomalous. As a result of a measured latency being below the target latency, the corresponding API request fulfillment session data 218 may be categorized as being associated with an anomalous latency event or an alarm or notification may be provided. In one or more implementations, a confirmation of an API service failure for an anomalous latency event may be received from a user, or an input may be received from a user as an indication of a false alarm. The determined classification may be provided in a notification. Note that in some embodiments, a notification is only sent when an anomalous latency event is detected. In some embodiments, the notification may include a category classification (e.g., identifying an expected subcomponent failure).

Figure 3:
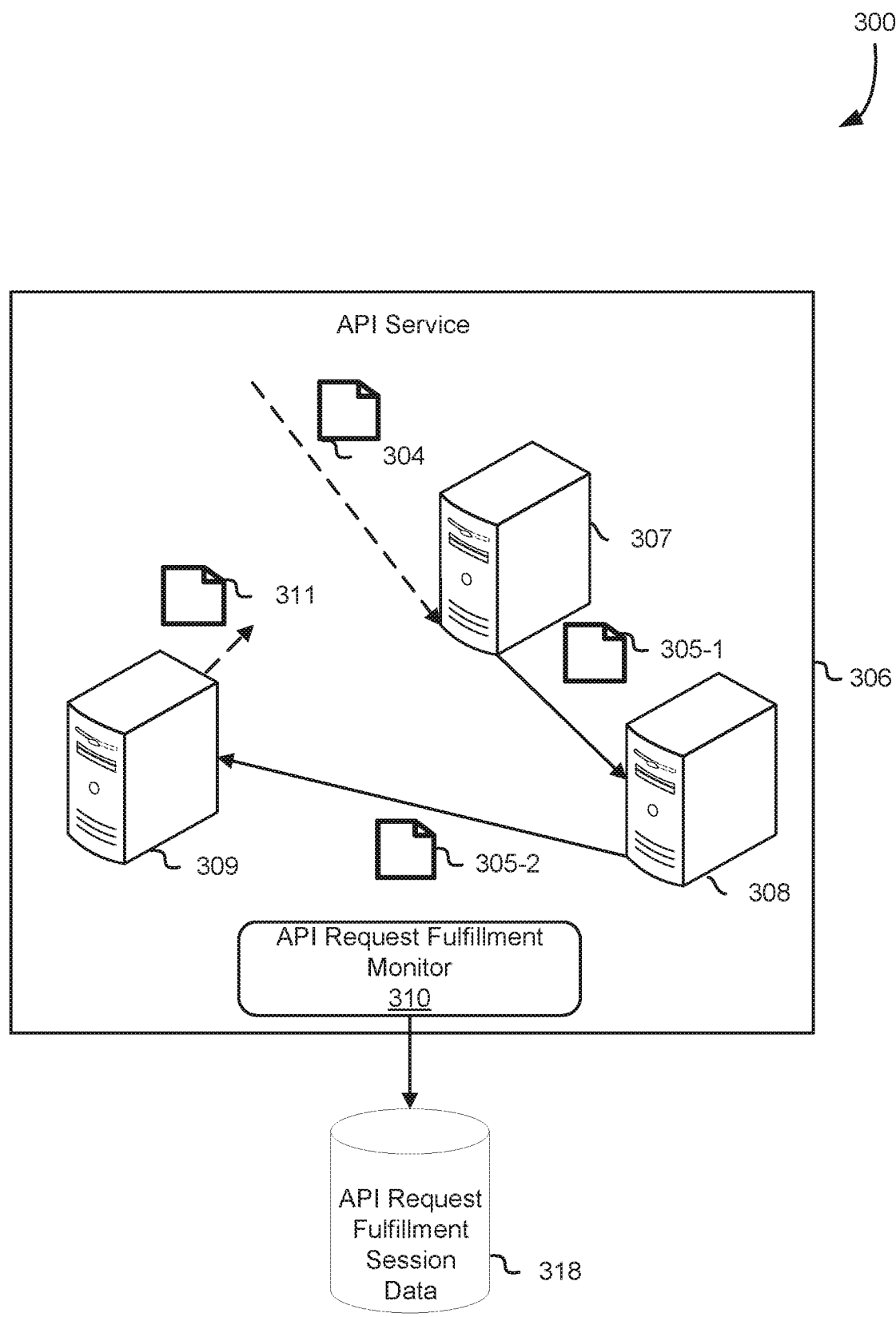
FIG. 3 shows an illustrative example of an environment in which an API service request that is serviced by multiple subtasks is monitored.

FIG. 3 shows a diagram 300 illustrating a context in which various techniques of the present disclosure may be utilized. In this particular example, the diagram 300 shows an environment where a task of API service request 304 may be fulfilled with a workflow that involves a plurality of subtasks that are performed by subcomponents 307, 308, 309 of API service 306. API request fulfillment monitor 310 may monitor or record data pertaining to the workflow, such as a type of content of data provided in the API service request (document, image, media file, etc.) or characteristics of data provided in in the API service request (e.g., amounts of paragraphs, words, lines, tables, human faces, animals, key-value pairs, headers footers, check boxes, buildings, particular items, etc.), latency for API service 301 to service API service request 304 or for a subcomponent to service a subtask, fleet capacity of API service or capacity of a subcomponent, or request rate on the overall API service 301 or one or more subcomponents 307, 308, 309. Such data may be recorded in API request fulfillment session data 318. Subcomponents 307, 308, and 309, which may be hardware components (e.g. instances or servers) used to fulfill respective first, second, and third subtasks of a workflow of an API service request 304.

In one or more implementations, subcomponent 307 receives API service request 304 from a client. API service request 304 may include data, such as a document or image that is to be serviced by API service 306. Subcomponent 307 fulfills a first subtask of a workflow of a task of API service request 305-1 and provides an output 305-1 to subcomponent 308, which fulfills a second subtask of the workflow and provides an output 305-2 to subcomponent 309. Subcomponent 309 fulfills third subtask of the workflow and provides a response 311 to API service 304 to the client. Workflow may be determined based on the type of API service request 304. For example, a request to an API service to perform human face detection may be serviced using a defined workflow that may be different from a defined workflow used to service a request to identify buildings. In some implementations, workflow may depend on a type of data included in API service request 304. For example, if the data is an image, it may get assigned a workflow that starts with a subtask that determines a resolution of the image. Workflows may be determined by a workflow manager component (not shown) of API service. Workflows may be determined in real-time such that a characteristic (.e.g. resolution or amount of lines) detected in a prior subtask of workflow may determine the next subtask of the workflow. For example, a subtask may determine a resolution of an image, and the next subtask may be determined based on the resolution. In this example, if the image is determined by a subtask to be a low resolution image, workflow may proceed to a subtask for line detection, and if the image is determined to be a high resolution image, workflow may proceed to a subtask for circle detection. In some implementations, workflow may depend on subcomponent demand such that workflow is prioritized to subcomponents with large amount of unused capacity, which may be determined based on the respective request rates and capacities of subcomponents.

An API request fulfillment monitor 310 may monitor and record data about the workflow. For example, API request fulfillment monitor 310 may measure and record a latency to service API service request 304 corresponding to an amount of time between when API service request 304 is received by API service 306 and when response 311 is output to client. API request fulfillment monitor 310 may monitor and record latencies corresponding to the first subtask, second subtask, or third subtask. For example, latency for first subtask may correspond to an amount of time between when API service request 304 is provided to first subcomponent and when output 305-1 is provided to the second subcomponent 308. Latency for the second subtask may correspond to an amount of time between output 305-1 being received by subcomponent 308 and output 305-2 being provided by subcomponent 308. Latency for the third subtask may correspond to an amount of time between output 305-2 being received by subcomponent 309 and response 311 being provided subcomponent.

Figure 4:
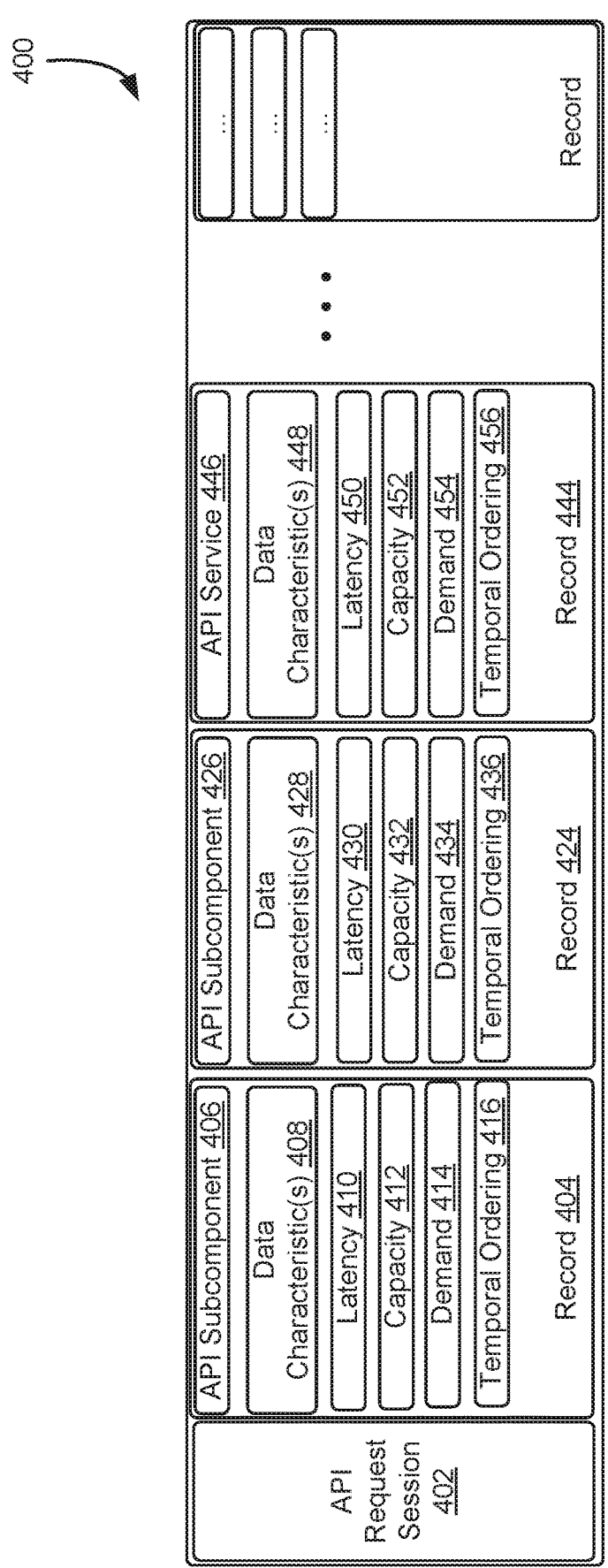
FIG. 4 shows an example of data that may be collected in connection with an API service request that is serviced by multiple components.

FIG. 4 shows a diagram 400 illustrating example API request session 402 that may be stored, for example, in API request fulfillment session data of FIGS. 1-3. Each API request session 402 may be associated with a workflow of a fulfillment an API service request. In the illustrative example of FIG. 4, the API request session 402 may contain an identifier (e.g., an address) of an API component or subcomponent. API service request information may be recorded in the API request session as records 404, 424, 444. In one or more embodiments, record 404 of API service request information contains at least API subcomponents identifiers 406, 426 identifying particular subcomponents of an API service indicated by API service identifiers 446. API request session 402 may include temporal ordering indicators 416, 436, 456 that, for example, indicate temporal ordering of workflow (e.g. sequence of subtasks fulfilled by subcomponents) used to fulfill a task of an API service request. API request session 402 may include capacity indicators 412, 432, 452 that indicate capacities (e.g., fleet capacities) of the respective API subcomponents or API service. API request session 402 may include demand indicators 414, 434, 454 that may indicate demand (e.g., request rate) on respective API subcomponents or API service. Demand and capacity may correspond to a time a task or subtask executes. API request session 402 may include latency indicators 410, 430, 450 that may indicate actual (e.g. measured) latencies for completing subtasks of a workflow of a task of an API service request or a latency for completion of the task of the API service request. API request session 402 may include data characteristics 408, 428, 448, which may be parameters related to data provided with an API service request. Data characteristics 408, 428, 448 may include parameters or content detected by an API service or subcomponent as a task or subtask of a workflow. For example, in a document analysis implementation, data characteristic 408 may indicate the amount of headers, lines, or words in the data. In some implementations, data characteristics 408, 428, 448 may include a binary indication, a score indicative of a confidence interval that the respective latency is not anomalous.

In some embodiments, the API request session 402 may be implemented using a linked list, array, deque (double-ended queue), list, map, queue, set, stack, unordered map, unordered set, vector, or other suitable container including but not limited to any combination of the above structures. Furthermore, API request session need not be stored in a traditional data structure. As an example, network traffic information may instead be stored as records in a relational database, a distributed queue system, Bloom filter, etc. In some embodiments, an API request session 402 uses the temporal ordering to determine how to insert the received API request information to the session. As an example, an API request session 402 implemented as a vector that stores API request fulfillment information records in chronological order. The above associations are merely illustrative and not limitative of embodiments contemplated in the present disclosure. Additional metadata and/or information about a communication between client and server may be used to create additional associations as part of a mapping of associative metadata and/or information to an API request session.

Figure 5:
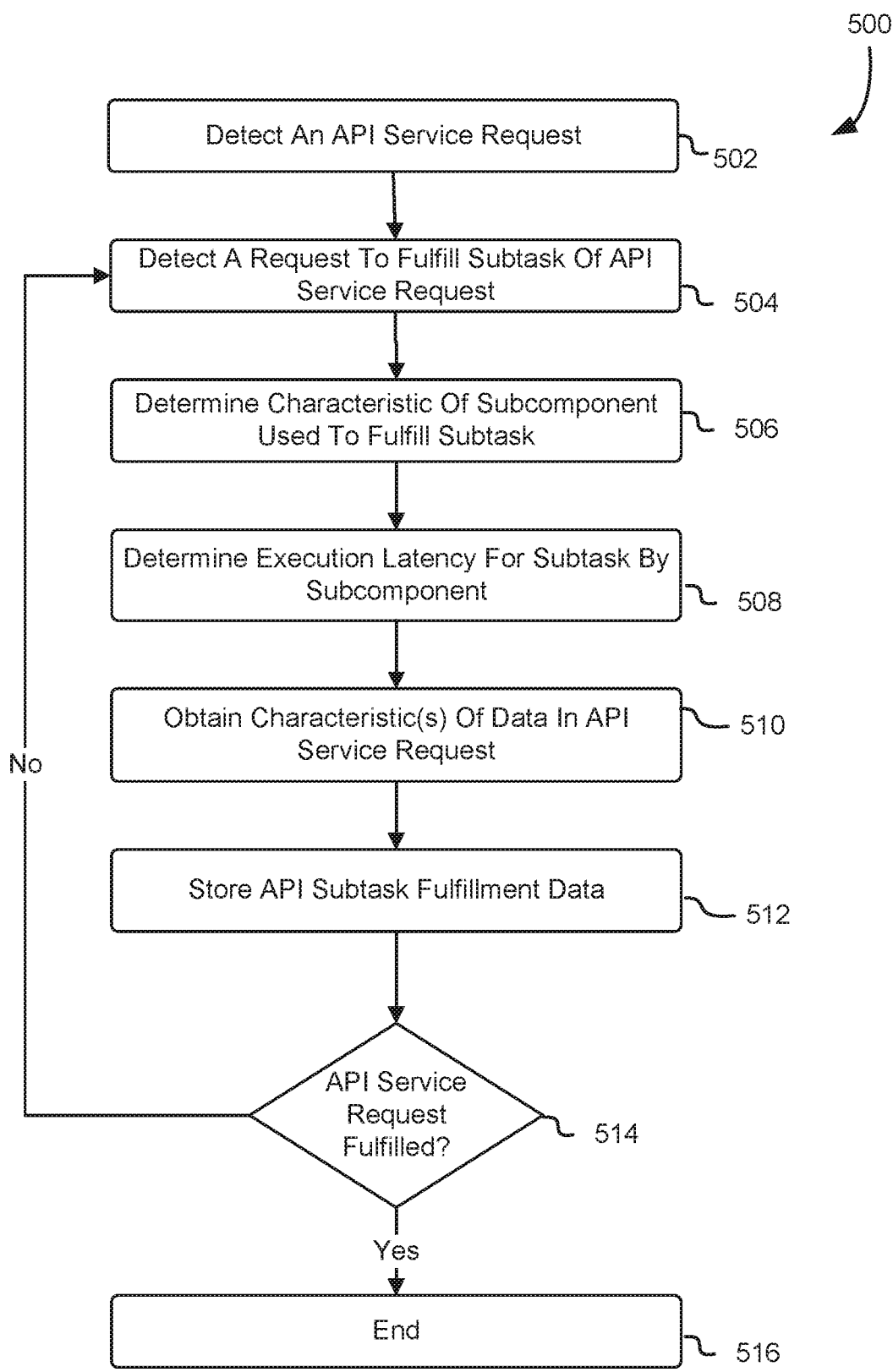
FIG. 5 shows an illustrative process for a system monitoring a fulfillment of an API service request.

FIG. 5 describes an illustrative example of a process 500 for monitoring and recording data related to subtasks of a document processing task. The process 500 may be performed by any suitable system, such as an API request fulfillment monitor described in connection with FIG. 2 or 3. API request fulfillment monitor may detect 502 an API service request, detect 504 a request to fulfill a subtask of the API service request, determine 506 capacity or demand of subcomponent used to fulfill the subtask, determine 508 latency for execution of subtask by subcomponent, determine 510 one or more characteristics of the data (e.g., document) of API service request. The process up until this point is repeated until the system detects that the API service request is fulfilled, at which point the process 500 will end. It will be appreciated that process 500 may be applicable to various types of data, such as media files, images, data structures, documents, and the like that may be provided in an API service request.

In some embodiments, an API monitoring component will detect 502 an API service request. The API monitoring component may be a component the API service, or may be a component distinct from API service. As an example, the API monitoring component described above in connection with FIG. 2 may implement the process 500. For the purpose of illustration, the process 500 is described in connection with the API service described above in connection with FIG. 2. The API service request may be a network packet or other communication packet indicating a sender and recipient and including data to be processed by the API service.

Upon detecting the API service request, the system may detect 504 a request to fulfill a subtask of the API service request. The subtask may be part of a workflow determined by a path management component of the API service. For a document analysis task, the subtask may be line detection or word detection functions, for example. The request to fulfill the subtask may be detected by an input being received by a subcomponent of the API service that performs the subtask.

The API monitoring component may determine 506 a characteristic of an API service or a subcomponent of an API service. In one or more implementations, the API monitoring component may determine a capacity, type of hardware, or demand on a subcomponent used to fulfill the subtask. For example, the API monitoring component may determine a capacity or a type of hardware used by looking it up in table or log, or by sending a query to the subcomponent. The capacity may indicate fleet capacity of the subcomponent. For example, the fleet capacity may be measured in units of computing instances or servers. A demand on the subcomponent used to fulfill the subtask may be determined by determining an amount of requests being received by the subcomponent. Such demand may be in units of transactions or requests per second. The capacity and demand values correspond to a time when the subtask executed. The API monitoring component may then determine 508 latency for the subtask to execute on the subcomponent. Such latency may be determined by measuring a time differential between when an input is received by the subcomponent and when an output is provided by the subcomponent. The time difference can be obtained, for example, from a log or timestamps. The API monitoring component may then obtain 510 one or more characteristics of data in the API service request. The monitoring component may obtain a characteristic as outputs from a subcomponent of the API service. The API monitoring component may then store 512 capacity of the subcomponent, demand on the subcomponent, and the characteristic of the data in API request fulfillment session data along with other data for the session. For example, the data stored at 512 may be stored in API request session 402 along with other data of the session. In some implementations, the capacity and demand for the API service may be determined based on the capacity or demand on the subcomponents of the API service.

If the API monitoring component determines that the API service request 514 is fulfilled, then the process 500 ends 516. The API monitoring component may determine that the API service request 514 is fulfilled by detecting a response to the API service request 514 being sent from the API service to a client. If the API monitoring component determines that the API service request 514 is not fulfilled, then the process 500 returns to block 504 to detect another request to fulfill a subtask of an API service request. The demand or capacity, latency, and characteristic for a next subtask may be stored in API request session 402.

Figure 6:
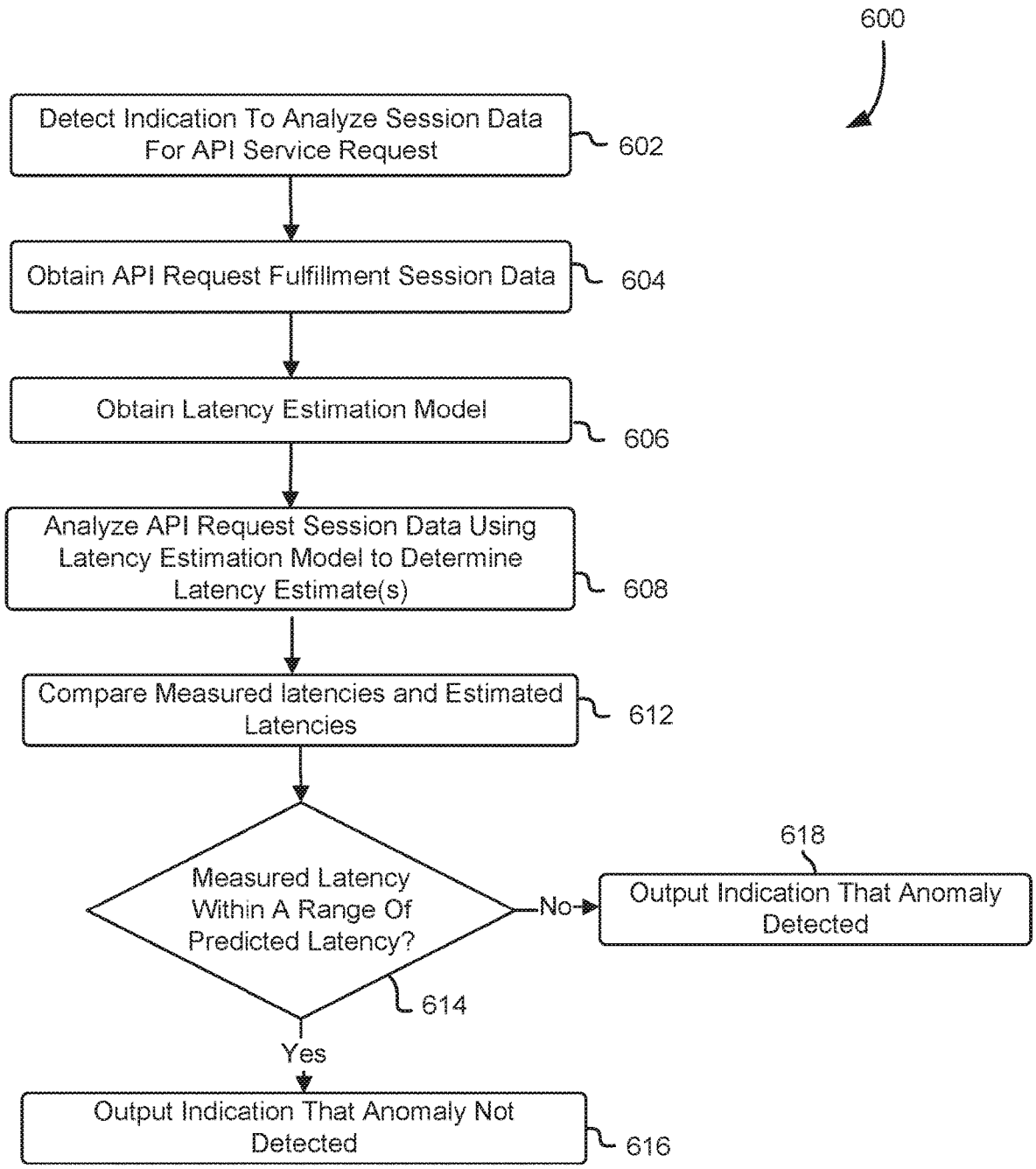
FIG. 6 shows an illustrative process for a system analyzing an API service request for latency anomalies.

FIG. 6 describes an illustrative example of a process 600 for analyzing an API service request for anomalies. The process 600 may be performed by any suitable system, such as an API request fulfillment analyzer in FIGS. 1-3. API request fulfillment analyzer may detect 602 an indication to analyze session data for an API service request, obtain 604 API request fulfillment session data, obtain 606 API latency estimation model, analyze 608 API request session data using latency estimation model to determine latency estimates, and compare 612 measured latencies and estimated latency. If the measured latencies are within a range of the estimated latency, the system may cause an indication to be output that no anomalies have been detected, and if any measured latency is not within a range of estimated latency, the system causes an indication of an anomalous latency event to be output. In some implementations, the indication of an anomalous latency event may be an alarm being output. In some implementations, if an alarm or an anomalous latency event is output, then the API service may be triggered to address the anomaly by adding or removing computing instances to the API service or restarting instances.

In some embodiments, system detects 602 an indication to analyze session data for an API service request. The indication to analyze the session data may be done by default or because a setting has been activated. In some embodiments, the indication may be an API request being received to analyze an API request session that is obtainable from the API request. In some embodiments, the system may detect a set of conditions are satisfied and as a result, an API request session should be analyzed. Examples of such conditions may include the availability of computing resources. In some embodiments, the indication may be time-based, for example, session data for API service request may be analyzed every day at midnight.

In some embodiments, a server may be configured to request that an API request session may be synchronously analyzed. In such an embodiment, the server may, upon detecting that an API service request has completed, request that the system analyze the API service request information for the fulfillment of the API service request.

After determining that the system should analyze a session, the system may obtain 604 API request fulfillment session data for the session corresponding to an API service request. The system may obtain 606 one or more latency estimation models that are trained to provide a latency estimate for non-anomalous operation for given inputs (e.g., capacity or request rate, data type, content type, detected characteristics and their amounts, data resolutions, data size, etc.). Latency estimation models may be generated or updated using API request fulfillment session data for non-anomalous operations. The latency estimation models may be stored in a repository. In one or more implementations, a latency estimation model may be selected from a plurality of latency estimation models based at least in part on the type of data in the API request fulfillment session data. For example, a latency estimation model may be selected based on the type of data (image, text, .pdf) that was submitted with the API service request. In another example, a latency estimation model may be selected based on the capacity or request rate of the API service. Note that in some embodiments, the API request fulfillment session data is obtained after one or more latency estimation models is/are obtained and that in some embodiments, the relative ordering of the steps 604 and 606 is non-deterministic or not guaranteed (e.g., wherein the steps 604 and 606 are performed by separate asynchronous worker threads).

After obtaining API request fulfillment session data for a session and a latency estimation model, the system may analyze 608 the API request fulfillment session data using the latency estimation model. In some embodiments, the API request fulfillment session data records include a temporal ordering that may be used to sort the records and obtain a sequence of records that correspond to a workflow of the API request. The API request fulfillment session data may be input to the latency estimation model to determine estimated execution latencies for subtasks of the session or an estimated execution latency for fulfilment of the API request.

The system may then compare 612 the estimated latencies derived from the latency estimation model with their corresponding measured latencies. In one or more implementations, such comparison may involve determining a target latency at least in part by adding an estimated latency to an amount of latency corresponding to a confidence interval for the estimated latency, and comparing the target latency to the actual latency.

The system checks at 614 if any of the measured latencies exceed the estimated latencies by a defined amount (e.g., 10% or 20%), fail to meet the estimated latencies by a defined amount, or fall outside of a defined range with respect to the estimated latency. In some implementations the range may be determined from a confidence interval for the estimated latency. For example, the range may correspond to the 90% confidence interval for the estimated latency (e.g. x milliseconds). If yes at 614, then the system outputs 616 an indication that an anomaly has not been detected for the API request. The indication may include adding the API request fulfillment session data to data that is used to update a latency execution model. If no at 614, then the system outputs 618 an indication that an anomalous latency event has been detected. For example, the system may initiate an alarm with a notification that indicates subcomponents or subtasks that are associated with the anomalous latency event or specifies an estimated latency and an actual latency for a subcomponent. In another example, the indication that an anomalous latency event has occurred may be a notification dispatched to a server identifying a classification. In some embodiments, the classification may be a binary classification that, for example, identifies API request fulfillment session data as anomalous or non-anomalous. In some implementations, API request fulfillment session data that is determined to be anomalous may be indicated to be anomalous in a record of an API request session. In some implementations, a user may override an anomalous classification of API request fulfillment session data.

In some embodiments, the system may determine that a subcomponent is malfunctioning due to an anomalous latency event or alarm having been output, determine a problem with the subcomponent, and subsequently determine a set of remedial steps to take. As an example, the system may determine that a subcomponent has an instance that needs to be updated or restarted, or the subcomponent has a virus, and then automatically performs the update, restart, or antivirus session. Additionally, in some embodiments, the system performs further steps to determine whether other remedial steps should be taken.

Figure 7:
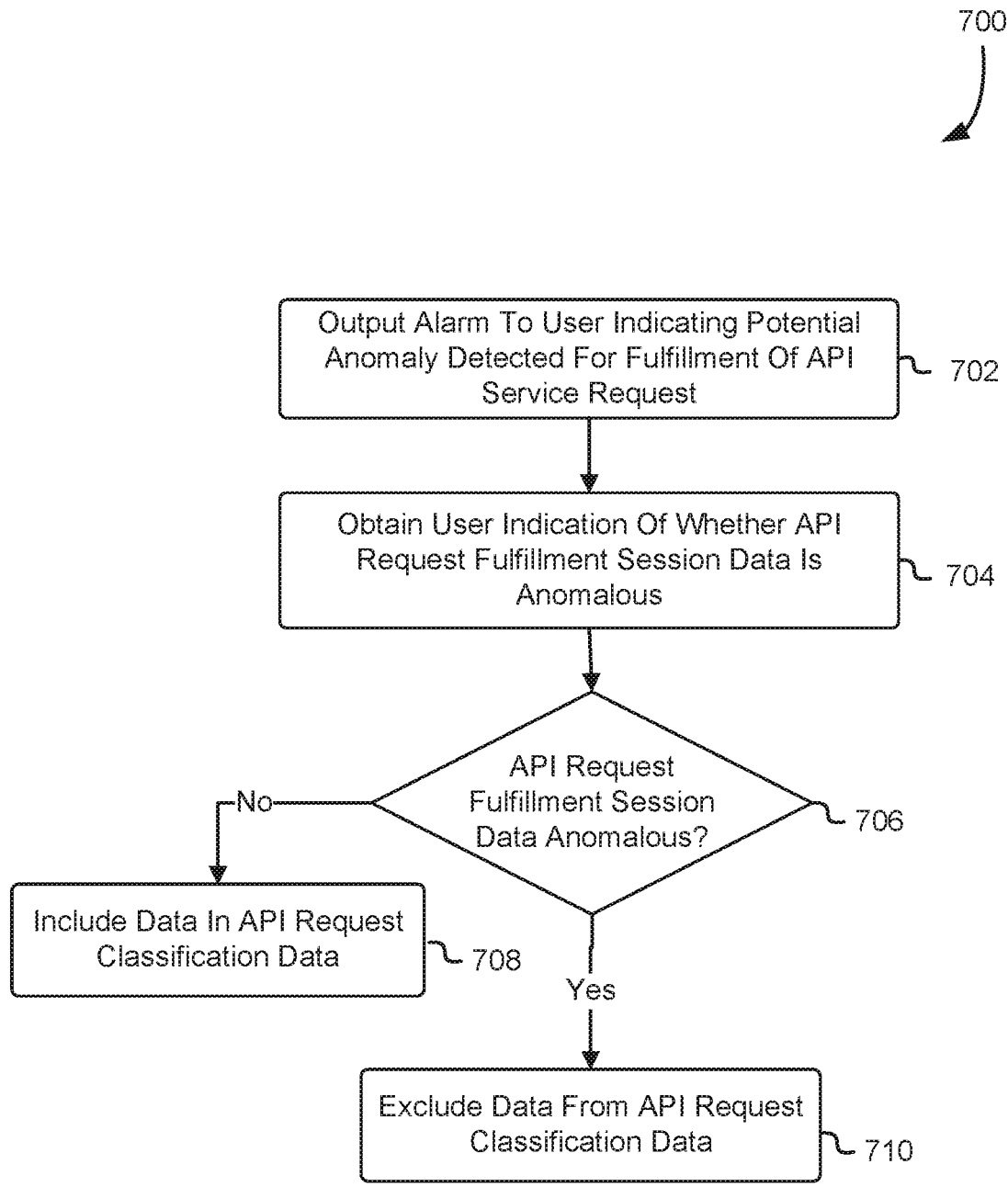
FIG. 7 shows an illustrative process for a system for verifying anomalies.

FIG. 7 describes an illustrative example of a process 700 where a user may verify the classifications of anomalies and utilize data that is not anomalous to train the API. The process 700 may be performed by any suitable system, such as an API request fulfillment analyzer described in connection FIGS. 1 and 2. API request fulfillment analyzer may output 702 an alarm or indication of potential anomaly to a user indicating that a potential anomaly has been detected for a fulfillment of an API service request and obtain 704 a user indication of whether API request fulfillment session data is anomalous. If at 706 an API request fulfillment session is indicated to be anomalous, then API request fulfillment analyzer may exclude the API request fulfillment session data 710 from API request classification data that may be used to train an API latency estimation model. If at 706, an API request fulfillment session is indicated to not be anomalous, then API request fulfillment analyzer may include the API request fulfillment session data in API request classification data 708 that is used to train an API latency estimation model. Process 700 allows users to override a false positive anomalous classification due to, for example, a new type of data being provided with an API service request or the user verifying using session logs, for example, that no anomaly occurred. The process of updating a latency estimation model with classification data that has been verified by a user allows for the model to have improved accuracy in making future estimates.

Figure 8:
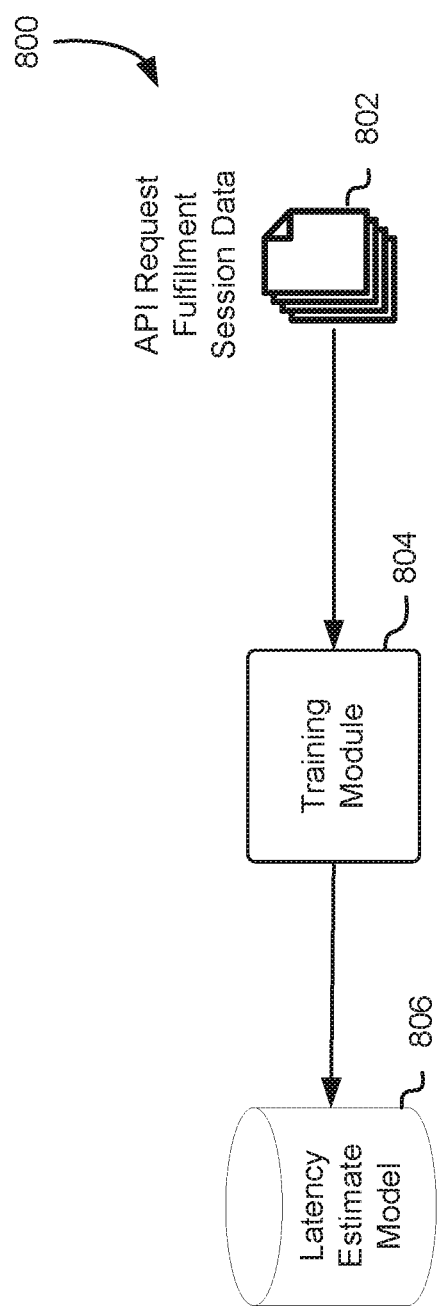
FIG. 8 shows an illustrative environment where API request fulfillment latency models are provisioned and later used to analyze API service request data for latency abnormalities.

FIG. 8 shows a diagram 800 illustrating a context in which various techniques of the present disclosure may be utilized. In this particular example, the diagram 800 shows an environment in which latency estimation models may be generated or updated in connection with determining latency estimates for fulfilling API service requests. In one or more implementations, the API request fulfillment session data 802 for a plurality of fulfilled API service requests may be classified with an identified classification (e.g., anomalous or not anomalous) using a latency estimation model or user inputs to obtain API request classification data, which may be used by training module 804 to generate or update a latency estimate model 806. An API request fulfillment analyzer may use the model to analyze API request fulfillment session data. In one or more implementations, a user input being received that is indicative of a potential anomaly not being an anomaly causes the latency estimation model to automatically update, based on an actual latency and the API request fulfillment session data, the latency estimation model.

Figure 9:
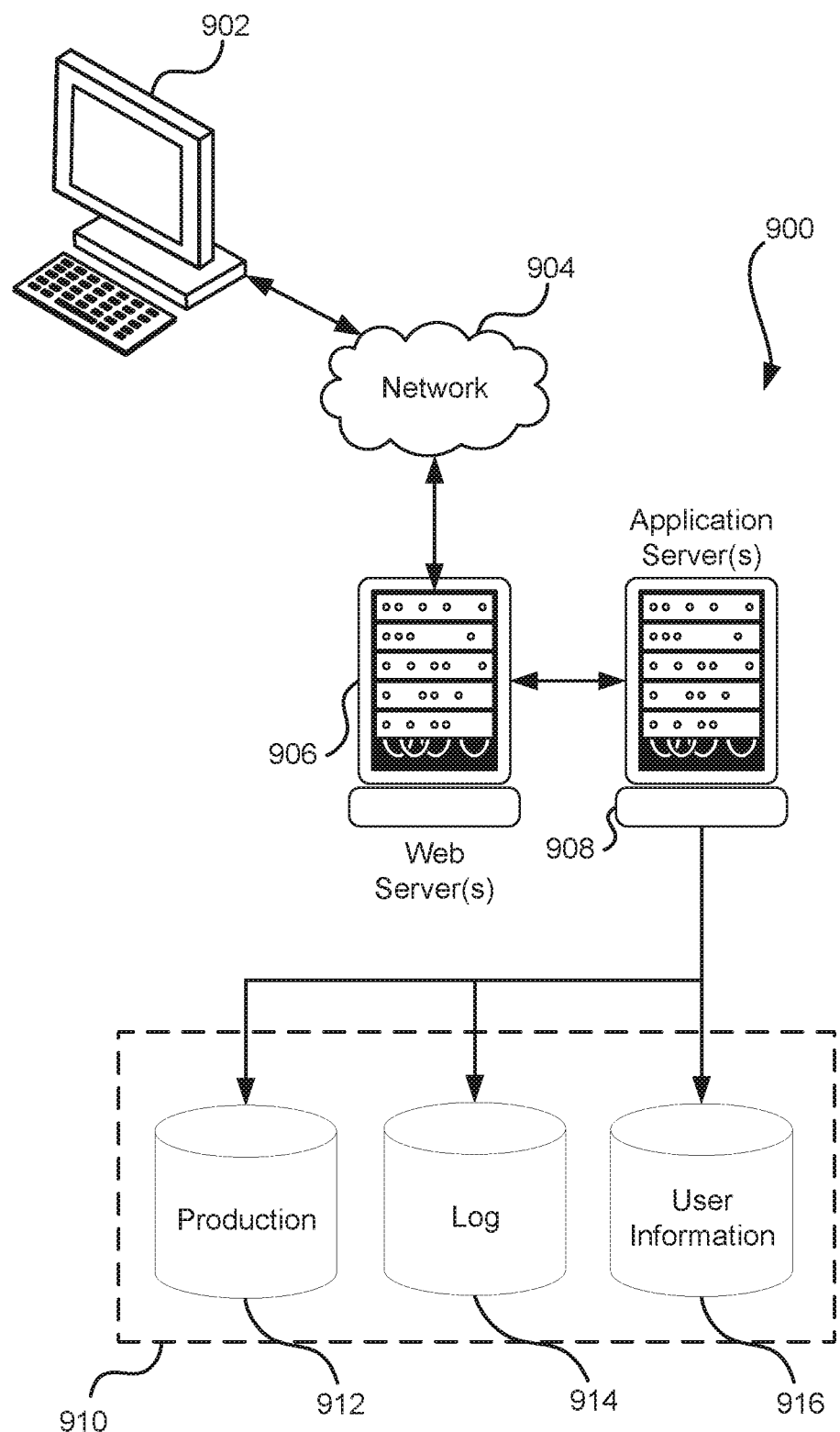
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes an application program interface 906 for receiving requests, providing services, and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface ("API") requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   detecting a service request to an application programming interface (API) to fulfill a task, the service request indicating a document;
   obtaining information indicative of at least a characteristic of the document;
   determining a utilization value that is indicative of an amount of utilization for a subcomponent of the API used to fulfill a first subtask of the task, wherein the utilization value is determined based at least in part on other requests serviced by the subcomponent of the API at a time corresponding to the fulfillment of the first subtask;
   determining an estimated latency for the subcomponent of the API to fulfill the first subtask at least in part by applying a latency estimation model for the API to at least the information and the utilization value;
   obtaining an actual latency for the subcomponent of the API to fulfill the first subtask;
   comparing the estimated latency to the actual latency at least in part by comparing a target latency to the actual latency to determine that the subcomponent of the API experienced an anomalous latency event corresponding to the task, wherein the target latency is determined based at least in part on the estimated latency; and
   as a result of the actual latency exceeding the target latency, providing an indication of the anomalous latency event.

2. The computer-implemented method of claim 1, wherein
   the target latency is determined at least in part by adding the estimated latency to an amount of latency corresponding to a confidence interval for the estimated latency.

3. The computer-implemented method of claim 1, wherein:
   fulfillment of the task involves a workflow with a plurality of subtasks, the plurality of subtasks comprising the first subtask and a second subtask, the second subtask being dependent on the first subtask; and
   the information is obtained as a result of the second subtask being fulfilled.

4. The computer-implemented method of claim 1, wherein:
   individual subcomponents of the API fulfill respective subtasks of the task; and
   the estimated latency for the subcomponent of the API to fulfill the first subtask is further determined at least in part on further applying the latency estimation model for the API to a type of software utilized by the subcomponent.

5. A system, comprising:
   one or more processors; and
   memory that stores computer-executable instructions that, if executed, cause the one or more processors to at least:
     obtain information indicative of at least a characteristic of data of a request provided to an application programming interface (API), the API including a plurality of subcomponents;
     obtain a utilization value that is indicative of an amount of utilization for a first subcomponent of the API used to fulfill a subtask of a task of the request, wherein the utilization value is determined based at least in part on other requests serviced by the first subcomponent for a time that corresponds to the fulfillment of the subtask;
     determine an estimated latency for the first subcomponent to fulfill the subtask at least in part by applying a latency estimation model for the API to at least the information and the utilization value; and
     as a result of a comparison of the estimated latency to a measured latency for the first subcomponent to perform the subtask indicating a potential anomaly, output an indication of the potential anomaly, wherein the comparison of the estimated latency to the measured latency includes a comparison of a target latency to the measured latency, and wherein the target latency is determined based at least in part on the estimated latency.

6. The system of claim 5, wherein the output of the indication of the potential anomaly comprises a notification that includes at least one of:
   the estimated latency and the measured latency; or
   a confidence score that provides a numerical value that is indicative of a probability that an anomalous latency event occurred.

7. The system of claim 6, wherein the memory that stores computer-executable instructions that, if executed, further cause the one or more processors to at least:
   as a result of a user input that is indicative of the potential anomaly not being an anomaly, update the latency estimation model with the characteristic of the data of the request, utilization of the first subcomponent of the API, and the measured latency.

8. The system of claim 5, wherein:
the utilization value for the first subcomponent is an amount of utilization of the first subcomponent; and
the utilization value is further determined based at least in part on a fleet capacity of the first subcomponent.

9. The system of claim 5, wherein:
the data includes a textual document; and
the characteristic of the data includes at least: an amount of paragraphs, an amount of words, an amount of lines, an amount of tables, an amount of key-value pairs, an amount of headers, an amount of footers, or an amount of check boxes.

10. The system of claim 5, wherein:
the data includes an image; and
the characteristic of the data is indicative of at least one of: an amount of a visual characteristic in the image, a resolution of the image, or a size of the image.

11. The system of claim 5, wherein the information is obtained as a result of a different subtask of the task of the request being fulfilled by a second subcomponent of the API.

12. The system of claim 5, wherein the utilization value is determined, subsequent to the request being provided to the API, at least in part by a second subcomponent of the API.

13. A non-transitory computer-readable storage medium storing thereon executable instructions that, as a result of being executed by one or more processors of a computer system, cause the computer system to at least:
obtain a characteristic of a service request to fulfill a task;
obtain an amount of utilization that is indicative of an amount of utilization for a first subcomponent of an Application Programming Interface (API) used to fulfill a first subtask of the task, wherein the amount of utilization of the first subcomponent is determined based at least in part on other requests serviced by the first subcomponent at a time that corresponds to the fulfillment of the task;
determine an estimated latency for the API to fulfill at least a portion of the task at least in part by applying a latency estimation model for the API to at least the characteristic and the amount of utilization of the first subcomponent;
obtain an actual latency for the API to perform at least the portion of the task;
compare the estimated latency to the actual latency at least in part by comparing a target latency to the actual latency, wherein the target latency is determined based at least in part on the estimated latency; and
as a result of the actual latency exceeding the target latency, cause an output of a notification.

14. The non-transitory computer-readable storage medium of claim 13, wherein:
the service request specifies an image; and
the characteristic indicates at least: a resolution of the image, a size of the image, or an amount of a visual characteristic included in the image.

15. The non-transitory computer-readable storage medium of claim 14, wherein:
fulfillment of the task involves a workflow with a plurality of subtasks;
the plurality of subtasks comprises a first subtask that is performed by the first subcomponent of the API and a second subtask that is performed by a second subcomponent of the API; and
the first subtask includes determining the first characteristic.

16. The non-transitory computer-readable storage medium of claim 13, wherein:
the target latency is determined at least in part on a confidence score for the actual latency; and
the notification is caused to be output as a result of the confidence score being below a threshold.

17. The non-transitory computer-readable storage medium of claim 13, wherein the estimated latency for the API to fulfill at least a portion of the task is determined at least in part by applying the latency estimation model for the API to an amount of visual content included in a document that is indicated by the service request and a fleet capacity of a subcomponent of the API.

18. The non-transitory computer-readable storage medium of claim 13, wherein the characteristic indicates at least: a type of computer hardware used by at least a portion of the API, an amount of requests handled by at least a portion of the API in an amount of time, or an amount of computing resources available to at least a portion of the API.

19. The non-transitory computer-readable storage medium of claim 13, wherein the characteristic is indicative of a size or a resolution of a document indicated by the service request.

20. The non-transitory computer-readable storage medium of claim 13, wherein:
fulfillment of the task includes performing the first subtask and a second subtask on a document that is indicated in the service request;
the estimated latency for the API to fulfill at least the portion of the task is further determined at least in part by applying the latency estimation model for the API to a fleet capacity of a second subcomponent of the API that performs the second subtask on the document; and
the second subtask is different than the first subtask.

* * * * *